United States Patent [19]

Gartner et al.

[11] Patent Number: 4,904,984

[45] Date of Patent: Feb. 27, 1990

[54] COMBINATION LOCK WITH AN ADDITIONAL SECURITY LOCK

[76] Inventors: Klaus W. Gartner, 2632 Via Anacapa, Palos Verdes Estates, Calif. 90274; Alan K. Uyeda, 8317 Elsomore Dr., Rosemead, Calif. 91770

[21] Appl. No.: 205,447

[22] Filed: Jun. 10, 1988

[51] Int. Cl.[4] .......... E05B 45/06; G06F 7/04; H01H 47/00

[52] U.S. Cl. .......... 340/543; 70/333 R; 340/825.31; 361/172

[58] Field of Search .......... 340/542-543, 340/825.31, 825.32; 361/171-172; 70/333 R, 303 A, 1.5

[56] References Cited

U.S. PATENT DOCUMENTS

| | | | |
|---|---|---|---|
| 3,702,070 | 11/1972 | Gartner | 70/278 |
| 3,702,551 | 11/1972 | Blizard | 70/303 A X |
| 3,981,167 | 9/1976 | Phillips | 70/311 |
| 4,148,092 | 4/1979 | Martin | 361/172 |
| 4,532,785 | 8/1986 | Uyeda | 70/333 R |
| 4,628,715 | 12/1986 | Uyeda et al. | 70/333 R |
| 4,745,784 | 5/1988 | Gartner | 70/303 A X |
| 4,754,629 | 7/1988 | Allen | 70/333 R |
| 4,756,176 | 7/1988 | Uyeda | 70/303 A |
| 4,774,512 | 9/1988 | Jolidon | 340/825.31 |
| 4,831,851 | 5/1989 | Larson | 70/303 A |

*Primary Examiner*—Glen R. Swann, III
*Assistant Examiner*—Thomas J. Mullen, Jr.
*Attorney, Agent, or Firm*—Poms, Smith, Lande & Rose

[57] ABSTRACT

A combination lock is provided with an additional security lock wherein an electrically operable solenoid, having an armature post normally biased outwardly of a solenoid body is mounted to the combination lock housing so as to position the armature post normally to block movement of either the combination lock bolt or the bolt release lever associated with the bolt. An electrical signal generator which may be an electrical switch, electronic lock mechanism or other electrical signal generating means, is provided for selectively operating the solenoid to retract the post from a bolt and/or bolt release lever blocking position to thereafter allow operation of the combination lock in an otherwise standard mechanical manipulation or electronic digital input of the main combination lock.

10 Claims, 3 Drawing Sheets

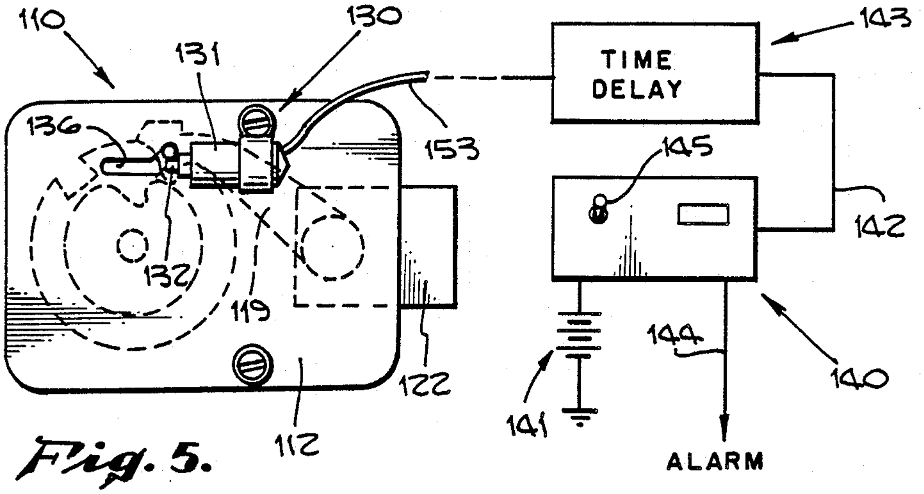
*Fig. 5.*
*Fig. 6.*
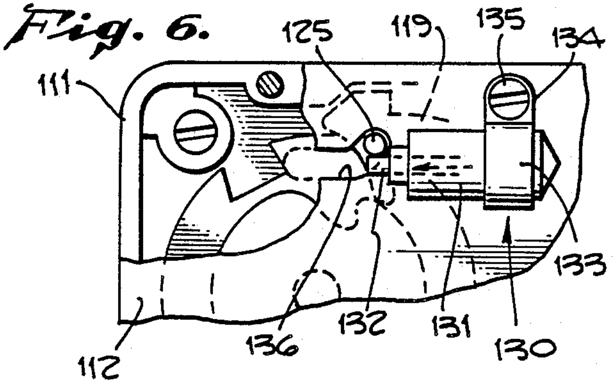
*Fig. 4.*
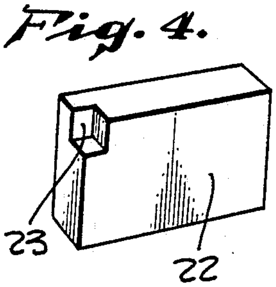
*Fig. 7.*
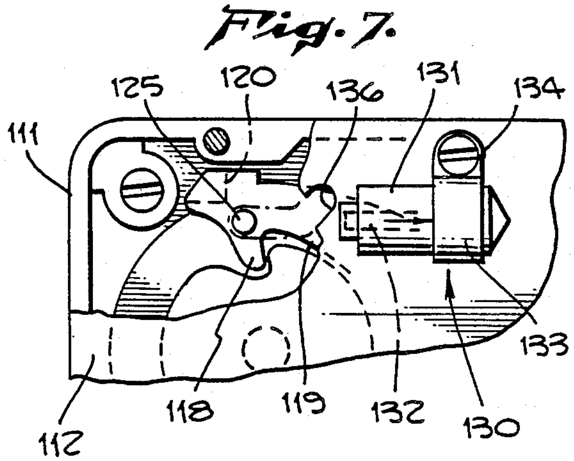
*Fig. 8.*
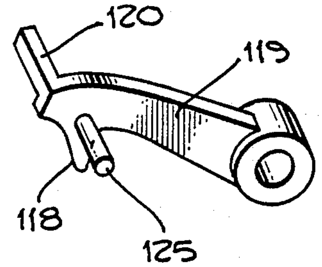

COMBINATION LOCK WITH AN ADDITIONAL SECURITY LOCK

BACKGROUND OF THE INVENTION

The present invention relates in general to combination locks for safes and the like and more particularly to such combination locks having additional locking means for preventing manipulation of the combination lock until a preliminary security lock release is effected.

Various types of combination locks have been developed heretofore such as in United States Letters Patent Nos. 3,981,167; 4,532,785; and 4,628,715 which includes a plurality of gated tumbler wheels within a lock housing which are manipulated through turning a dial exteriorly of the housing. When the gates of the tumbler wheels are aligned, an associated fence portion of a bolt release lever is allowed to move into engagement with a cam way of a dial associated cam means to allow movement of the bolt via the bolt release lever through continued rotation of the combination lock dial after entry of the combination via the dial. Other types of combination locks have also been developed heretofore, wherein a combination must be entered either by digital input to an electronic mechanism or the manipulation of a dial in order to move a bolt and/or bolt associated release lever to allow access to a safe or security space protected by the lock mechanism.

It would also be desirable to have an additional security lock associated with such combination locks in order that additional security controls may be afforded. For example, it would be desirable to have an alarm circuit associated with such locks provided so that on operation of a preliminary switch or lock mechanism, an alarm signal would be generated for noticing proposed entry to the security location or safe and it would be desirable to delay the actual manipulation of the combination lock by such authorized personnel until appropriate security personnel had an opportunity to take action with regard to the alarm signal. It would also be desirable to be able to record personal identification code numbers for authorized individuals who know the combination lock and access the safe or security space protected thereby. A record of such access by authorized individuals would also be desired so that security personnel could be aware of the times, dates and identification of individuals accessing the protected space.

SUMMARY OF THE INVENTION

It is therefore a primary object of the present invention to disclose and provide an additional security lock mechanism for use with mechanical and/or electrical combination locks whereby the identification of authorized personnel accessing the protected space are identified, whereby an alarm signal can be generated for notifying security personnel as a preliminary stage to operation of the combination lock and wherein a time delay may be imposed upon operation of the combination lock until security personnel have been made aware of the proposed access to the combination lock.

Generally stated, the present invention includes the provision of a combination lock having a housing, a bolt moveable between protracted or retracted positions, and a bolt operating mechanism, which may include a bolt release lever, and an additional security lock which preferably includes an electrically operable solenoid having an armature post normally biased outwardly of a solenoid body, mounting means for mounting the solenoid body to the housing of the combination lock with the post positioned to normally prevent operation of the bolt or its associated bolt release lever and an electrical signal generator means and associated circuitry for selectively operating the solenoid to retract the bolt in response to signal generated by such generating means to allow operation of the bolt to its retracted position by entry of the combination into the combination lock after an appropriate electrical signal has been sent by the signal generator means to the solenoid.

More specifically the present invention includes the provision of an electrical solenoid associated with the combination lock bolt and/or bolt release lever as stated hereinabove wherein the electrical signal generator means may comprise a switch mechanism and a circuit from a source of electrical power, an electronic lock mechanism having an electrical digital input code for operation thereof and sending an electrical signal to the solenoid, or an electronic signal generating means which produces an electrical signal in response to the entry of a sequential manipulation of an associated combination dial. The present invention further includes the provision of means for recording a user identification code entered into the electrical signal generating means to operate the solenoid as aforestated as a preliminary to manipulation of the combination lock whereby the identification of individuals accessing the security space or safe protected by the combination lock can be recorded.

These and other objects, advantages of the present invention, as well as a better understanding of the present invention, will be afforded to those skilled in the art from a consideration of the following detailed description of a preferred and alternative exemplary embodiment of combination lock with an additional security lock in accordance with the present invention. Reference will be made to the appended sheets of drawings which will first be described briefly.

BRIEF DESCRIPTION OF THE DRAWINGS

FIG. 4 is a perspective view of a exemplary embodiment of bolt suitable for use in the embodiment of lock of FIGS. 1 through 3.

FIG. 5 is an alternative exemplary embodiment of combination lock with an additional security lock in accordance with the present invention.

FIG. 6 is a detailed view, partially in section, of a portion of the combination lock of FIG. 5 showing the additional security lock in a bolt release lever blocking position.

FIG. 7 is a view as in FIG. 6 showing the additional security lock in a bolt release lever non-blocking position.

FIG. 8 is a perspective view of a preferred embodiment of bolt release lever suitable for use in the combination lock of FIGS. 5 through 7.

DETAILED DESCRIPTION OF THE EXEMPLARY EMBODIMENTS

Figure 1:
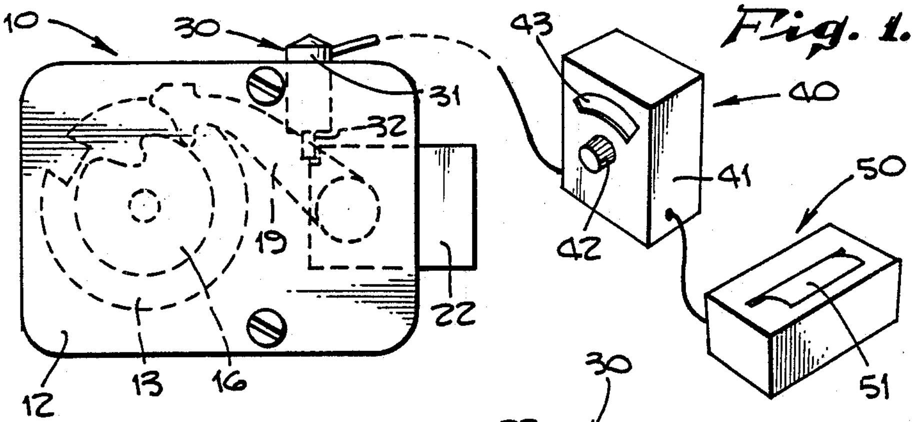
FIG. 1 is a partially schematic view of a preferred exemplary embodiment of combination lock with an additional security lock in accordance with the present invention.

Referring initially to FIGS. 1 through the preferred exemplary embodiment of combination lock with an additional security lock, in accordance with the present invention, is illustrated wherein the combination lock is provided in accordance with the disclosures of United States Letters Patent No. 3,981,167 and 4,532,785 which are incorporated herein by this reference and with the addition of the additional security lock as described hereinafter.

Figure 3:
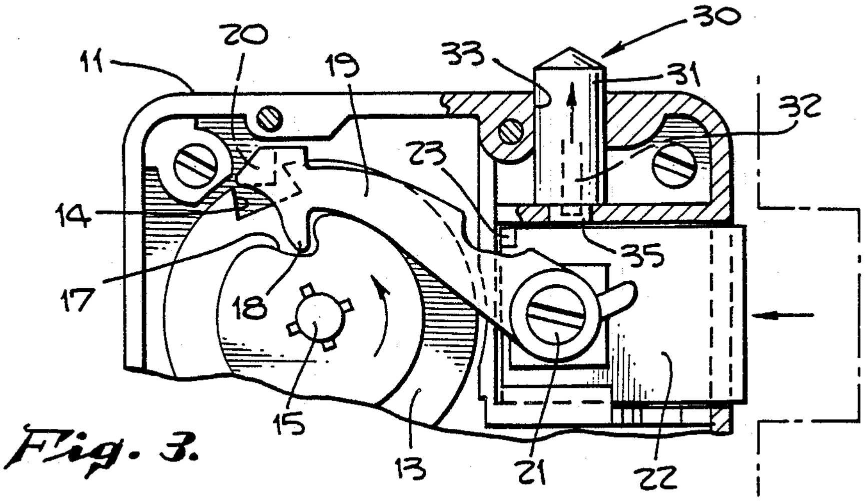
FIG. 3 is a view as in FIG. 2 showing the additional security lock in a bolt release position.

Referring initially to the combination lock 10, which may be made in accordance with said United States Letters Patent No. 3,981,167, and is now known in the industry, has a housing 11 enclosed by a face plate 12. A plurality of gated tumbler wheels as wheel 13 having gate 14, are provided within the lock housing 11 in known manner to be manipulated individually by a combination dial, not seen, via the dial shaft 15. A cam wheel 16 on the dial shaft 15 is provided with a cam way 17 which receives the nose of bolt release lever 19, as seen in FIG. 3, when the associated fence 20 is received in the aligned gates of the tumbler wheels. The bolt release lever is connected in known manner by pin 21 to the bolt 22 to facilitate movement of bolt 22 in response to a retractive movement imparted thereto through the rotation of the dial shaft 15 in a counterclockwise direction in FIG. 3 when the bolt released lever nose 18 is in engagement with the cam way 17 following entry of a predetermined combination into the combination lock.

As is particularly contemplated within the present invention, an additional security lock is provided which prevents opening of the combination lock thus far described until the additional security lock has been operated as a preliminary step to opening of the combination lock. It should also be recognized that while a mechanical combination lock has been illustrated in the present preferred exemplary embodiment, the combination lock 10 could also comprise an electrical lock which requires a digital input of a predetermined combination for operating an associated bolt.

Figure 2:
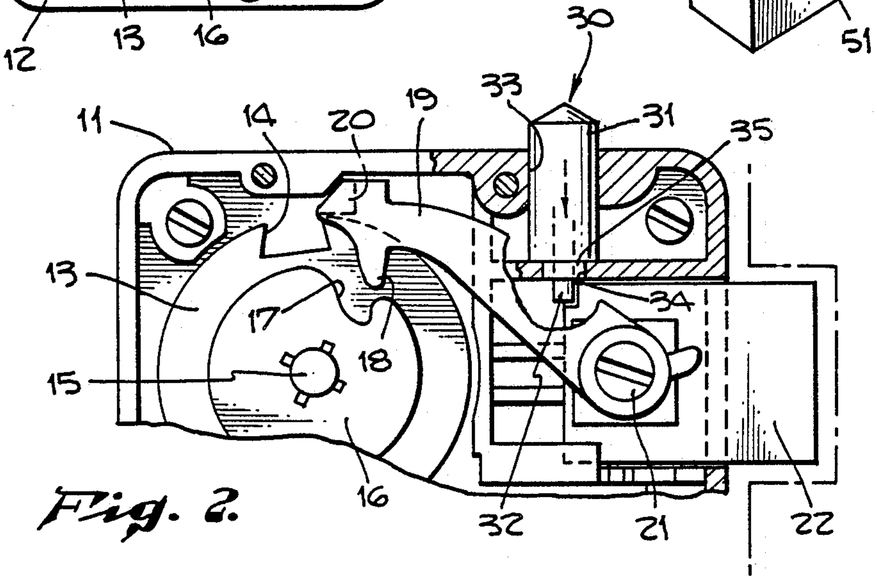
FIG. 2 is a front view, partially in section, of the combination lock of FIG. 1 showing the additional security lock in a bolt locking position.

The additional security lock of the preferred exemplary embodiment includes the provision of an electrically operable solenoid, indicated generally at 30, which includes a housing 31 and an armature post 32 which is normally biased by an associated internal spring means to a position extending outwardly of the solenoid body as seen in FIGS. 1 and 2. The housing 11 of the exemplary combination lock provides a mounting means for mounting the solenoid body to the housing with the post 32 positioned to normally block movement of bolt 22 inwardly of the lock housing in a bolt release position when the post is in its normally outwardly biased position as seen in FIG. 2. Such mounting means in the preferred exemplary embodiment includes the provision of a first mounting aperture 33 in a sidewall of lock housing 11 through which the solenoid body 31 extends and a second, smaller diameter, mounting aperture 34 which receives, and positions reduced diameter boss 35 of the solenoid housing 31 as also seen in FIG. 2. Such mounting means positions the solenoid armature post 32 in a position to block the bolt 22, which in the preferred exemplary embodiment, as best seen in FIG. 4, is provided with a cut out or recess 23 to facilitate positioning post 32 in a reliable blocking position relative bolt 22.

Various electrical signal generating means may be provided in accordance with the present invention for selectively operating the solenoid, indicated generally at 30, to withdraw the solenoid armature post 32, as seen in FIG. 3, to allow release of the bolt for operation through normal manipulation of the combination lock.

Electrical signal generating means, in accordance with the present invention, are illustrated generally at 40 for selectively operating the solenoid, indicated generally at 30, to retract the solenoid post 32 and thereby release bolt 22 for movement by the associated locking means. In the preferred exemplary embodiment, the exemplary signal generating means, indicated generally at 40, preferably comprises an electronic lock mechanism which may be made in accordance with the disclosure of United States Letters Patent No. 3,702,070 entitled "SEQUENTIAL SIGNAL PRODUCING MEANS", the disclosure of which is hereby incorporated by this reference. As seen in FIG. 1, the exemplary electronic lock mechanism includes a housing 41 within which the electronic mechanism is contained and has a dial 42 which can be manipulated, as in the dial and push mode of U.S. Pat. No. 3,702,070. The combination being selected may be viewed through an appropriate viewing window as window 43.

The combination to be entered into the signal generating means, indicated generally at 40, may comprise a user code for each authorized individual, each of the codes operating the signal generator means to operate the solenoid, indicated generally 30, to a bolt unlocking position. In accordance with the present invention, a code printer, known per se, is indicated at 50 for recording the code as they are entered in the signal generator means, indicated generally at 40. Such codes may be printed on a typical data printout sheet 51 so that an identification of those authorized individuals who entered their personal identity code in the signal generator means, indicated generally at 40, will be identified as having access the safe or security space protected by the combination lock 10.

Referring now to FIGS. 5 through 8, an alternative exemplary embodiment of combination lock with an additional security lock, in accordance with the present invention, is illustrated in association with a combination lock 110 which is substantially the same as lock 10 of the prior embodiment. In the present embodiment, as will be described hereinafter, the additional security lock operates on the combination lock bolt release lever rather than directly on the bolt as in the prior embodiment. Therefore, the combination lock 110 of the present embodiment is constructed substantially the same as lock 10 of the prior embodiment but with a bolt 122 which need not have a recess as recess 23 in FIG. 4. However, the bolt release lever 119, as seen in FIG. 8 for this embodiment, in addition to the nose 118 and fence 120 is provided with a blocking pin 125 in accordance with the present invention to cooperate with the exemplary embodiment of additional security lock indicated generally at 130 in FIGS. 5 through 7. In this embodiment, the additional security lock includes an electrically operable solenoid, indicated generally 130, having a solenoid housing 131 and armature post 132 normally biased outwardly of the solenoid body. The mounting means for mounting the solenoid body to the housing in the present embodiment includes the provision of a bracket 133 which has a cylindrical band configuration surrounding housing 131 which is mounted by end flanges, as flange 134, to the exterior of the lock housing via a mounting screw 135 as seen in FIG. 6. Such means positions the solenoid armature post 132 in a position to engage the blocking pin 125, which protrudes through the housing cover 112, outwardly of the lock housing 111, via the slot like aperture 136. Slot like aperture 136 is provided in the housing cover 112 so as to conform to the movement of blocking pin 125 during manipulation of the bolt release lever 119 in response to operation of the combination lock as described previously with regard to the bolt release lever 19 of the first embodiment described hereinbefore.

When the electrically operable solenoid, indicated generally at 130, has its armature post 132 protruding in the normal position, as seen in FIG. 6, the bolt release lever 119 is blocked against a release movement. However, as is also particularly contemplated within the present invention, electrical signal generating means are provided for selectively operating the solenoid to retract post 132 and thereby release bolt 122 for movement by the associated locking mechanism of combination lock 110.

In the alternative exemplary embodiment, the exemplary electrical signal generally means comprises the provision of electrical switch means, indicated generally at 140, for completing an electrical circuit from an electrical source, indicated generally at 141, through circuit 142, a time delay means, known per se, indicated generally at 143 and electrical conduit 143 to the solenoid body 131. Time delay mechanisms are well known in the art and the amount of time delay may be selected for delaying entry of an individual until an alarm has been given to an appropriate security personnel. Such alarms are also well known in the art and an alarm circuit 144 is indicated in FIG. 5 as being associated with the switch 140 so that when the switch lever 145 is thrown by an authorized person seeking entry to the safe protected by the combination lock 110, an alarm signal will be sent via circuit 144 to a security personnel and the time for operating the solenoid 130 to allow access to the safe will be delayed by the time delay mechanism 143.

Figure 9:
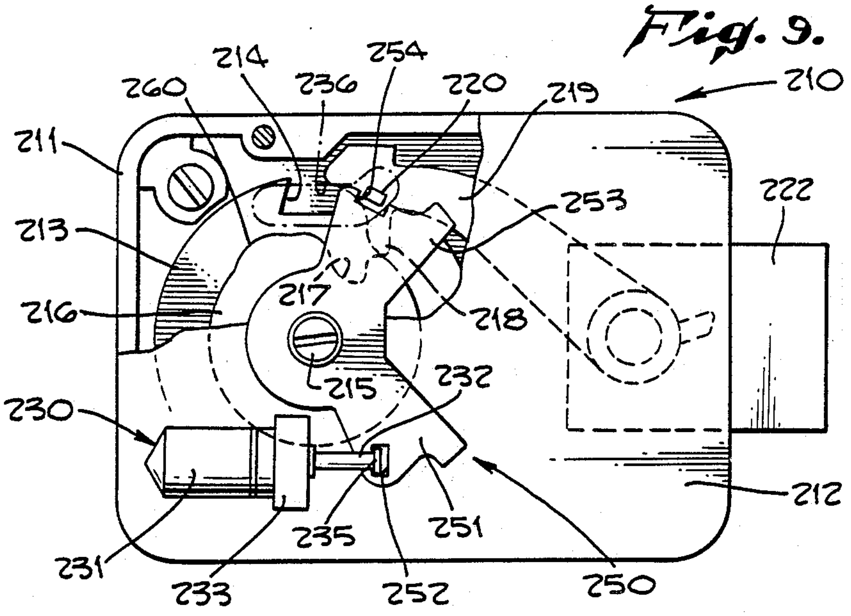
FIG. 9 is a still further alternative exemplary embodiment of combination lock with an additional security lock in accordance with the present invention.
Figure 10:
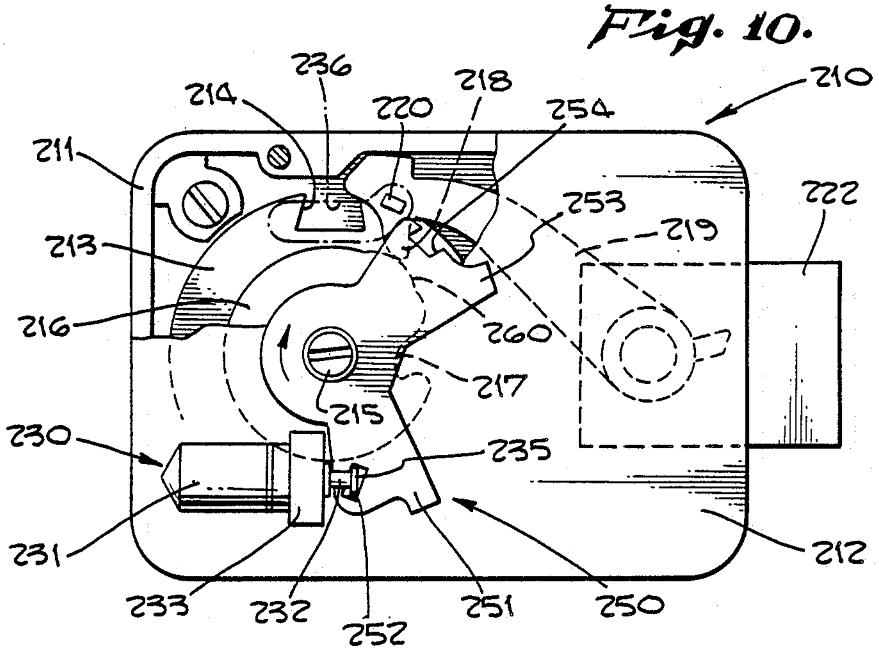
FIG. 10 is a view as in FIG. 9 showing the additional security lock mechanism in a bolt release lever non-blocking position.

Referring now to FIGS. 9 and 10, it is still a further alternative exemplary embodiment of combination lock with an alternative embodiment of additional security lock, in accordance with the present invention is illustrated in association with a combination lock 210 which is substantially the same as the lock 10 and 110 of the prior embodiments. As in the prior alternative embodiment, the additional security lock of the present embodiment operates on the combination lock bolt release lever rather than directly on the bolt as in the first embodiment. As seen in FIGS. 9 and 10, the bolt release lever 219 is pivotally connected in known manner to bolt 222 and is provided with a fence 220 adapted to enter gates 214 of the tumbler wheels 213 when the combination is properly entered. When the gates of the tumbler wheels are so aligned, and fence 220 is free to enter such gates, the fence lever nose 218 engages in the cam way 217 of cam wheel 216 to allow movement of bolt 222 by turning of the associated lock dial which is connected by shaft 215 to cam wheel 216.

In the embodiment of FIGS. 9 and 10, the additional security lock includes an electrically operated solenoid, indicated generally at 230, having a solenoid housing 213 mounted by a bracket 233 to the lock housing 211 and has an armature post 232 normally biased outwardly of the solenoid body. The solenoid body mounting means provided by flange 233 mounts the solenoid within the lock housing 211 beneath the face plate 212.

In the present embodiment, the additional security lock further includes the provision of pivoted plate 250 which is pivoted by a central aperture on the shaft 215. As seen in FIGS. 9 and 10, a lower leg 251 of plate 250 is connected to the armature post 232 by provision of a flange 235 which is entrained within a slot 252 in the plate. As seen from a comparison of FIGS. 9 and 10, operation of the solenoid, indicated generally at 230, rotates the pivot plate 250 in a clockwise direction from the position of FIG. 9 to that of FIG. 10. An upper leg 253 of the pivoted plate is provided with a recess 254 which normally receives the fence 220 of bolt release lever 219 as seen in FIG. 9. In addition, the present embodiment includes the provision of a cam surface 260 on the periphery of cam wheel 216 in order to raise the fence 220 out of recess 254 once upon each complete rotation of wheel 216, a seen in FIG. 10. If the solenoid, indicated generally at 230, has been operated by associated signal generating means at the time the fence 220 is raised from recess 254 of plate 250, plate 250 will rotate under the urging of the solenoid post 232 in a clockwise direction, as seen in FIG. 10, to release the fence and associated bolt release lever to be then controlled through manipulation of the combination lock provided by the tumbler wheels 213 and the cam wheel 216. Such signal generating means may be provided as in the prior exemplary embodiments or by an electronic lock mechanism presently know per se in the art. Therefore, the additional security lock must first be operated by an appropriate electronic signal generating means and thereafter the combination lock may be manipulated in otherwise known manner to cause retraction of bolt 222.

Having thus described an exemplary embodiment of combination lock with an additional security lock feature in accordance with the present invention, it should now be apparent to those skilled in the art that the within invention achieves the various objections and advantages initially discussed herein. It should also be understood by the those skilled in the art various modifications, adaptations and alternative embodiments of the lock of the present invention may be made within the scope and spirit of the present invention which is defined by the following claims.

We claim:

1. In a combination lock having a housing, a bolt moveable relative the housing, a bolt locking mechanism operable between a bolt locking and bolt release condition through entry of a lock opening combination by digital input of a predetermined code to operate the locking mechanism, the improvement comprising the provision of:

an electrically operable solenoid having an armature post normally biased outwardly of a solenoid body;

mounting means for mounting said solenoid body to said housing with said post positioned to normally block a lock opening movement of said bolt relative said housing; and electrical signal generating means operable by said digital input of a predetermined code for selectively operating said solenoid to retract said post and thereby release said bolt for movement by the associated locking mechanism.

2. In a combination lock having a housing, a bolt movable relative the housing, a bolt locking mechanism operable between a bolt locking and bolt release condition through entry of a lock opening code by digital input to the locking mechanism, or by entry of a lock opening combination by dial manipulation of the locking mechanism, said locking mechanism including a plurality of tumbler wheels and a bolt release lever having a fence associated with said tumbler wheels, the improvement comprising the provision of:

an electrically operable solenoid having an armature post normally biased outwardly of a solenoid body;

mounting means for mounting said solenoid body to said housing with said post positioned normally to block movement of said fence relative said tumbler wheels; and electrical signal generating means operated by said digital input of a predetermined code for selectively operating said solenoid to retract said post and thereby release said bolt for movement by the associated locking mechanism.

3. In a combination lock having a housing, a bolt moveable between protracted and retracted positions, a bolt operating mechanism including a lock operable through entry of a predetermined code into said lock to allow retraction movement of said bolt, the improvement comprising the provision of:

an electrically operable solenoid having an armature post normally biased outwardly of a solenoid body;

mounting means for mounting said solenoid body to said housing with said post positioned to normally prevent operation of said bolt to its retracted position; and an electrical signal generator means and associated circuitry operable by entry of each predetermined code for selectively operating said solenoid to retract said post in response to a signal generated by said generator means to allow operation of said bolt to its retracted position by entry of said combination into said lock, wherein:

said bolt has a recess in a rearward portion thereof; and said mounting means mounts said solenoid body to position said post normally in engagement with said bolt via said recess.

4. In a combination lock having a housing, a bolt moveable between protracted and retracted positions, a bolt operating mechanism including a lock operable through entry of a predetermined code into said lock to allow retraction movement of said bolt, the improvement comprising the provision of:

an electrically operable solenoid having an armature post normally biased outwardly of a solenoid body;

mounting means for mounting said solenoid body to said housing with said post positioned to normally prevent operation of said bolt to its retracted position; and an electrical signal generator means and associated circuitry operable by entry of each predetermined code for selectively operating said solenoid to retract said post in response to a signal generated by said generator means to allow operation of said bolt to its retracted position by entry of said combination into said lock, wherein:

said lock includes a manually operated combination means for opening said lock which includes a plurality of gated tumbler wheels;

said bolt operating mechanism includes a bolt release lever having a fence receivable in said tumbler wheel gates when the latter are aligned through entry of the predetermined combination; and said mounting means positions said post normally to block movement of said fence into said gates until said post is retracted against its bias.

5. The improvement in combination lock of claims 1, 2, 3 or 4 wherein said signal generator means comprises:

a user code receiving and recording means for initiating said signal in response to the entry of a predetermined user identifying code whereby the personal identification code of the individual accessing the lock must be entered and recorded before the combination lock can be operated to retract said bolt.

6. The improvement in combination lock of claims 1, 2, 3 or 4 wherein said signal generator means comprises:

a time delay means for delaying the arrival of a said signal to said solenoid for a predetermined delay time period; and an alarm means is provided for responding to said signal generator means operation to promptly give an alarm upon operation of the signal generator means while said time delay means delays operation of said solenoid.

7. In a combination lock having a housing, a bolt moveable relative the housing, a bolt locking mechanism operable between a bolt locking and bolt release condition through entry of a lock opening combination by digital input or dial manipulation of the locking mechanism, said locking mechanism including a plurality of tumbler wheels and a bolt release lever having a fence associated with said tumbler wheels, the improvement comprising the provision of:

an electrically operable solenoid having an armature post normally biased outwardly of a solenoid body;

mounting means for mounting said solenoid body to said housing with said post positioned normally to block movement of said fence relative said tumbler wheels;

electrical signal generating means for selectively operating said solenoid to retract said post and thereby release said bolt for movement by the associated locking mechanism; and a pivoted plate and means for pivotally mounting said plate within said housing with a first part of said plate normally underlying said fence to prevent said fence from engaging said tumbler wheels, said plate having a second part thereof connected to said armature post whereby said plate first part is pivoted away from said fence when said post is retracted.

8. In a combination lock having a housing, a bolt moveable between protracted and retracted positions, a bolt operating mechanism including a lock operable through entry of a predetermined combination into said lock to allow retraction movement of said bolt, the improvement comprising the provision of:

an electrically operable solenoid having an armature post normally biased outwardly of a solenoid body;

mounting means for mounting said solenoid body to said housing with said post positioned to normally prevent operation of said bolt to its retracted position; and an electrical signal generator means and associated circuitry for selectively operating said solenoid to retract said post in response to a signal generated by said generator means to allow operation of said bolt to its retracted position by entry of said combination into said lock, wherein:

said lock includes a plurality of gated tumbler wheels;

said bolt operating mechanism includes a bolt release lever having a fence receivable in said tumbler wheel gates when the latter are aligned through entry of the predetermined combination;

said mounting means positions said post normally to block movement of said fence into said gates until said post is retracted against its bias; and said post is connected to a pivoted plate pivotally mounted within said lock housing, said plate normally engaging said fence to block said movement until said plate is pivoted away from said fence in response to said post being retracted.

9. The improvement in combination lock of claim 7 or 8 wherein said signal generator means comprises:

a user code receiving and recording means for initiating said signal in response to the entry of a predetermined user identifying code whereby the personal identification code of the individual accessing the lock must be entered and recorded before the combination lock can be operated to retract said bolt.

10. The improvement in combination lock of claims 7 or 8 wherein said signal generator means comprises:

a time delay means for delaying the arrival of a said signal to said solenoid for a predetermined delay time period; and an alarm means is provided for responding to said signal generator means operation to promptly give an alarm upon operation of the signal generator means while said time delay means delays operation of said solenoid.

* * * * *